United States Patent
Chatterjee et al.

(10) Patent No.: US 7,408,016 B2
(45) Date of Patent: Aug. 5, 2008

(54) METHODS FOR PRODUCING AND PURIFYING 2-HYDROCARBYL-3,3-BIS(4-HYDROXYARYL)PHTHALIMIDINE MONOMERS AND POLYCARBONATES DERIVED THEREFROM

(75) Inventors: Gautam Chatterjee, Bangalore (IN); Anantharaman Dhanabalan, Bangalore (IN); Katherine Glasgow, Evansville, IN (US); Vinod Kumar Rai, Karnataka (IN); Suresh Shanmugam, Bangalore (IN); Veeraraghavan Srinivasan, Bangalore (IN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 144 days.

(21) Appl. No.: 11/263,132

(22) Filed: Oct. 31, 2005

(65) Prior Publication Data

US 2007/0010619 A1    Jan. 11, 2007

Related U.S. Application Data

(60) Provisional application No. 60/697,139, filed on Jul. 7, 2005.

(51) Int. Cl.
*C08G 64/00* (2006.01)
(52) U.S. Cl. .................. 528/271; 528/272; 548/472; 549/308
(58) Field of Classification Search .............. 548/472; 549/308; 528/271, 272
See application file for complete search history.

(56) References Cited

U.S. PATENT DOCUMENTS

| | | |
|---|---|---|
| 3,671,487 A | 6/1972 | Abolins |
| 3,723,373 A | 3/1973 | Lucas |
| 4,217,438 A | 8/1980 | Brunelle et al. |
| 5,132,359 A | 7/1992 | Sasaki et al. |
| 5,344,910 A | 9/1994 | Sybert |
| 5,387,629 A | 2/1995 | McGrath et al. |
| 5,455,310 A | 10/1995 | Hoover et al. |
| 5,804,525 A | 9/1998 | Boden et al. |
| 6,344,505 B1 * | 2/2002 | Valentine et al. ............. 524/91 |
| 6,605,659 B2 | 8/2003 | Blackburn et al. |
| 6,613,824 B2 | 9/2003 | Campbell et al. |
| 7,109,274 B2 * | 9/2006 | Acar et al. ................. 525/439 |
| 7,135,577 B2 * | 11/2006 | Rai et al. .................... 548/472 |
| 2005/0222334 A1 * | 10/2005 | Srinivasan et al. .......... 525/178 |

FOREIGN PATENT DOCUMENTS

| | | |
|---|---|---|
| EP | 0025859 | 4/1981 |
| JP | 2820277 B2 | 3/1991 |
| JP | 06-003838 | 1/1994 |
| JP | 06-082624 | 3/1994 |
| JP | 2005068216 A | 3/2005 |

OTHER PUBLICATIONS

Lin and Pearce, "Polymers with Improved Flammability Characteristics. I. Phenolpthalein-Related Homopolymers", Journal of Polymer Science: Polymer Chemistry Edition, vol. 19, pp. 2659-2670 (1981).
Lin and Pearce, "Thermal Degradation Study of Phenolphtalein Polycarbonate", Journal of Polymer Science: Polymer Chemistry Edition. vol. 19, 2773-2797 (1981).
R. Albert: "Phenolphtaleinanilid und Orcinphtaleinanilide", Chem. Ber. vol. 26, 1893, pp. 3077-3079. (translation).
ASTM: D 1925-70 (Reapproved 1988) "Standard Test Method for Yellowness Index of Plastics" pp. 1-3.

* cited by examiner

*Primary Examiner*—Terressa M Boykin

(57) ABSTRACT

A composition comprising a polycarbonate, wherein the polycarbonate has a weight average molecular weight of greater than 15,000, comprises more than 15 mole percent structural units derived from a 2-aryl-3,3-bis(4-hydroxyaryl) phthalimide:

wherein $R^1$ is selected from the group consisting of aryl groups having 6 to 25 carbon atoms and aralkyl groups having 7 to 25 carbon atoms, and $R^2$ is selected from the group consisting of a hydrogen, a hydrocarbyl group, and a halogen; and further wherein the polycarbonate has a yellowness index of less than 10 as measured on a 3 millimeter thick plaque in accordance with ASTM D1925 is disclosed.

26 Claims, 1 Drawing Sheet

METHODS FOR PRODUCING AND PURIFYING 2-HYDROCARBYL-3,3-BIS(4-HYDROXYARYL)PHTHALIMIDINE MONOMERS AND POLYCARBONATES DERIVED THEREFROM

The present application incorporates by reference in their entirety U.S. patent application Ser. No. 10/815,880 filed on Mar. 31, 2004 and its continuation-in-part application U.S. patent application Ser. No. 10/925,041 filed Aug. 24, 2004, and claims the benefit of U.S. Provisional Application No. 60/697,139 filed on Jul. 7, 2005. It is noted however that the identification of the critical impurity of 2-hydrocarbyl-3-[(4-hydroxyaryl)(2-hydroxyaryl)]phthalimide in these applications was in error due to misassignment of a peak in HPLC data. Subsequent analytical work has revealed that the peak assigned as 2-hydrocarbyl-3-[(4-hydroxyaryl)(2-hydroxyaryl)]phthalimide was instead associated with 3-(4-amino-phenyl)-3-(4-hydroxyphenyl)-2-phenyl-indan-1-one (hereinafter referred to as "a,p-PPPBP").

BACKGROUND

The present disclosure generally relates to resins and resin blends and articles comprising thermoplastic polymers derived from 2-hydrocarbyl-3,3-bis(4-hydroxyaryl)phthalimide monomers. Homopolycarbonate and Copolycarbonate resins derived from such monomers generally have a higher Tg and greater oxygen and water permeability than resins derived from the most widely available commercial polycarbonate, bisphenol A ("BPA") polycarbonate homopolymers. As described herein, it is also possible to make such copolycarbonates with the transparency of polycarbonates and good color (i.e., low yellowness index) provided this monomer is made by a method that achieves sufficient purity. More particularly, the present disclosure relates to resin blends and articles comprising a polycarbonate comprising structural units derived from phenolphthalein derivatives, such as 2-hydrocarbyl-3,3-bis(4-hydroxyaryl)phthalimide monomer and an ABS (acrylonitrile-butadiene-styrene) resin. The present disclosure further relates to resins and resin blends and articles comprising a polycarbonate comprising structural units derived from relatively pure 2-hydrocarbyl-3,3-bis(4-hydroxyaryl)phthalimide.

It would be desirable to develop a process for preparing relatively pure phenolphthalein derivatives such as 2-hydrocarbyl-3,3-bis(4-hydroxyaryl)phthalimide, which can then in turn be used for producing polycarbonates and other polymers having significant content of structural units derived from this monomer, which polymers also have good color, (e.g., a yellowness index of less than about 10), and reasonably high weight average molecular weight (e.g., at least about 15,000). Further still, there is a need for such resins and resin blends and articles having excellent fire retardance and improved physical properties.

BRIEF SUMMARY

In one aspect, there is provided a composition comprising a polycarbonate, wherein the polycarbonate has a molecular weight of greater than 15,000, and comprises more than 15 mole percent structural units of the following formula derived from a 2-hydrocarbyl-3,3-bis(4-hydroxyaryl)phthalimide:

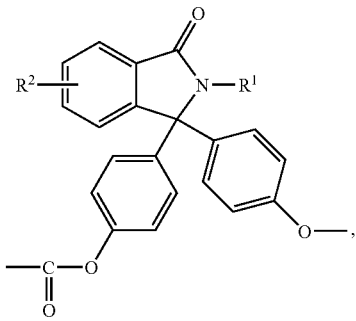

wherein $R^1$ is selected from the group consisting of a hydrogen and a hydrocarbyl group, and $R^2$ is selected from the group consisting of a hydrogen, a hydrocarbyl group, and a halogen; and further wherein the polycarbonate has a yellowness index (YI) of less than 10 as measured on a 3 millimeter thick plaque in accordance with ASTM D1925. There is also provided a composition wherein the polycarbonate has more than 20 mole percent structural units of the above formula. There is also provided a composition wherein the polycarbonate has more than 40 mole percent of the structural units of the above formula and a yellowness index of less than 6. There is also provided a composition having a molecular weight greater than 20,000. In a another aspect, there is provided an article including the above-described composition and a composition further including a second resin to enhance fire retardance and/or physical properties.

The above described and other features are exemplified by the following detailed description.

DETAILED DESCRIPTION

Figure 1:
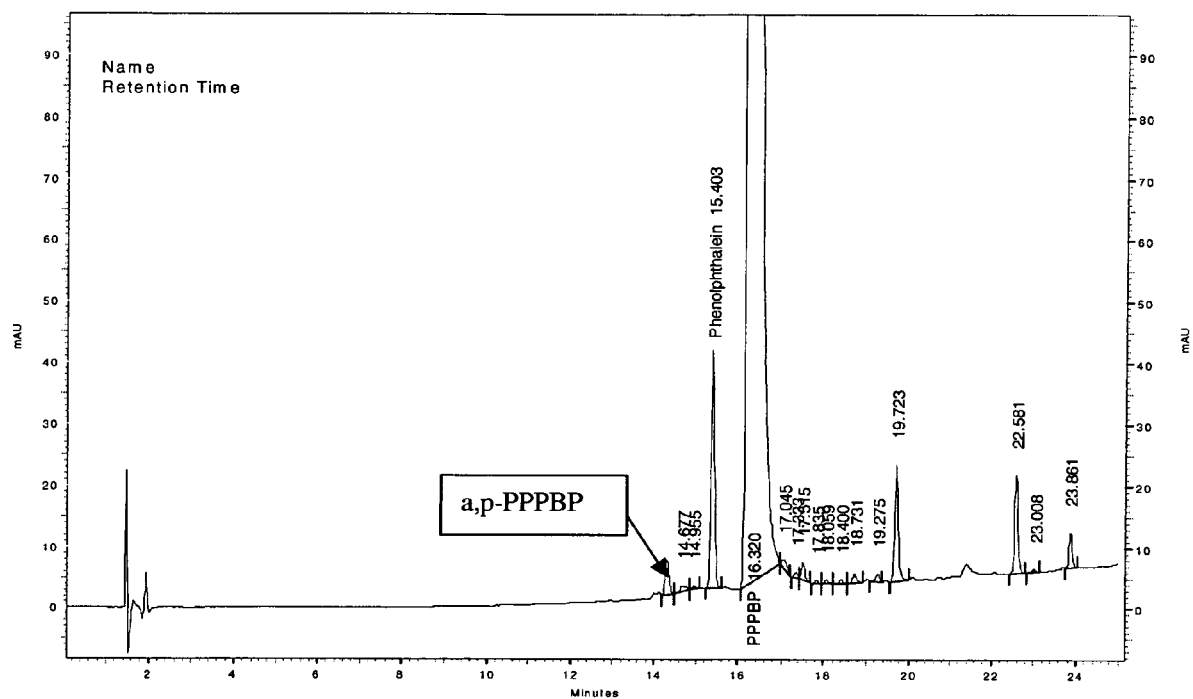
FIG. 1 provides an typical example of a high pressure liquid chromatography (HPLC) diagram identifying a peak corresponding to an a,p-PPPBP impurity in PPPBP.

For the purposes of this disclosure, the term "hydrocarbyl" is defined herein as a monovalent moiety formed by removing a hydrogen atom from a hydrocarbon. Representative hydrocarbyls are alkyl groups having 1 to 25 carbon atoms, such as methyl, ethyl, propyl, butyl, pentyl, hexyl, heptyl, octyl, nonyl, undecyl, decyl, dodecyl, octadecyl, nonadecyl, eicosyl, heneicosyl, dioctyl, tricosyl, and the isomeric forms thereof; aryl groups having 6 to 25 carbon atoms, such as ring-substituted and ring-unsubstituted forms of phenyl, tolyl, xylyl, naphthyl, biphenyl, tetraphenyl, and the like; aralkyl groups having 7 to 25 carbon atoms, such as ring-substituted and ring-unsubstituted forms of benzyl, phenylethyl, phenpropyl, phenylbutyl, naphthoyl, and the like; and cycloalkyl groups, such as cyclopropyl, cyclobutyl, cyclopentyl, cyclohexyl, cycloheptyl, cyclooctyl, and the like. The term "aryl" as used herein refers to various forms of aryl groups that have been described hereinabove for the "hydrocarbyl" group.

The present disclosure is in part directed to producing and purifying phenophthalein derivatives, which are suitable for use as monomers for preparing polymers. Further, the prepared polymers can be included in blends with other thermoplastic polymers, such as an ABS resin, to form molding compositions, which are in turn valuable for producing articles having excellent fire retardance and physical properties.

Exemplary phenophthalein derivatives are 2-hydrocarbyl-3,3-bis(4-hydroxyaryl)phthalimidines of formula (I):

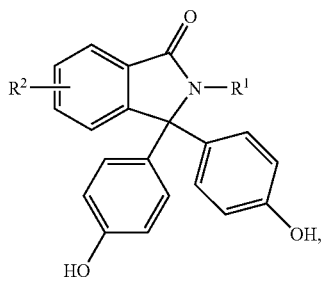
(I)

wherein $R^1$ is selected from a group consisting of a hydrogen and a hydrocarbyl group, and $R^2$ is selected from the group consisting of a hydrogen, a hydrocarbyl group, and a halogen. By way of example, 2-aryl-3,3-bis(4-hydroxyaryl)phthalimidines can generally be prepared by reaction of an aromatic amine (also referred to herein as "aryl amine"), e.g., an aniline, of formula (II):

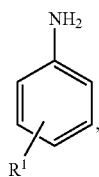
(II)

wherein $R^1$ is as defined above; with a phenolphthalein of formula (III):

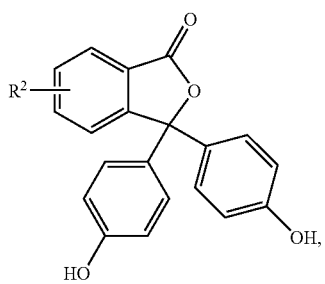
(III)

wherein $R^2$ is as previously defined. An acid catalyst is generally used to facilitate formation of the phthalimide product. Suitable acid catalysts that can be used include amine salts of mineral acids. Examples of suitable mineral acids include hydrochloric acid, sulfuric acid, and nitric acid. Examples of suitable amines include primary, secondary, and tertiary amines having any combination of aliphatic and aromatic groups bonded to the amine nitrogen. Suitable examples of amine salt catalysts include primary, secondary, and tertiary amine hydrochlorides. Hydrochloride salts of the primary aromatic amines of formula (II) are preferred since the amines of formula (II) also serve as the starting material for preparing the phthalimidines of formula (I). In one embodiment, the catalyst is introduced as a pre-formed salt into the reactor. In another embodiment, the catalyst is generated in the reactor by first charging the amine of formula (II) into the reactor, and then adding about ⅓ to about 1 part by weight of an appropriate mineral acid to phenolphthalein. In still another embodiment, about 0.1 parts to about 0.3 parts by weight of hydrogen chloride gas is introduced into a reactor charged with the aryl amine to form an appropriate amount of the aryl amine hydrochloride catalyst. More hydrochloric acid or more hydrogen chloride gas can also used, but is generally not required. A solvent can optionally be employed to form the aryl amine hydrochloride. The solvent can then be removed (if necessary), and the aryl amine of formula (II) can be added, followed by addition of phenolphthalein (III). The reaction of phenolphthalein (III) with the aryl amine (II) proceeds by a condensation reaction to form the desired phthalimide product (I). An excess of the aryl amine over the phenolphthalein may be used to keep the reaction proceeding in the forward direction. Likewise, a higher reaction temperature with or without removal of water by-product also facilitates product formation. However, in order to enhance the selectivity of 2-hydrocarbyl-3,3-bis(4-hydroxyaryl)phthalimide (I), and suppress the formation of undesired by-products, for example, it is preferred to control the temperature of the reaction mixture, and the rate of removal of water as well. The temperature of the reaction mixture and rate of water removal is controlled such that the crude 2-hydrocarbyl-3,3-bis(4-hydroxyaryl)phthalimide product is at least 97.5 area percent pure 2-hydrocarbyl-3,3-bis(4-hydroxyaryl)phthalimide in one embodiment, and at least 98 area percent pure in another embodiment In one embodiment, the reaction mixture is formed as described above, and the reaction temperature is controlled such that the water by-product (calculated based on the moles of the phenolphthalein (III) which is preferably the limiting reagent) distills over a period of about 12 hours to about 20 hours. If the reaction mixture is heated such that the amount of water by-product distills within about 6 hours, the phthalimide product of formula (I) has a relatively greater amount of impurities. Therefore, although a higher reaction temperature ensures a quicker consumption of the phenolphthalein (III), it also leads to formation of a higher amount of impurities. If the reaction temperature is not sufficiently high, and water by-product is not removed, a relatively large amount of the phenolphthalein remains unreacted, thereby leading to an inferior product, e.g., it forms colored byproducts during melt mixing, forms low molecular weight polymers, and the like. Thus, in one embodiment, the reaction mixture is heated to a temperature of about 130° C. to about 175° C. to remove water by-product and form the 2-hydrocarbyl-3,3-bis(4-hydroxyaryl)phthalimide product. In another embodiment, the reaction mixture is heated to a temperature of about 130° C. to about 170° C.

By way of example, phenolphthalein (i.e., formula (III) in which $R^2$ is H, and $R^3$ is phenyl) was reacted with aniline (i.e., formula (II) in which $R^3$ is H) in the presence of aniline hydrochloride as the catalyst to form 2-phenyl-3,3-bis(4-hydroxyphenyl phthalimide (i.e., para,para-PPPBP), as shown in formula (V).

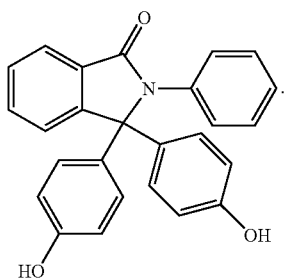

(V)

As will be discussed in the Example Section, the so-formed para, para-PPPBP was produced at high yields and was used to produce polycarbonates having a YI of less than about 10 and molecular weight greater than 15,000. Moreover, the reaction did not produce unacceptable levels of the a,p-PPPBP shown in Formula (VI) below.

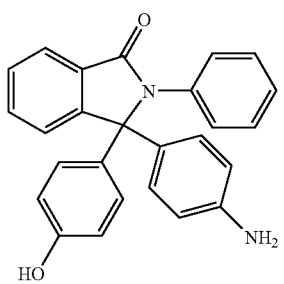

(VI)

Isolation of the desired phenolphthalein derivative from the reaction mixture is typically accomplished by quenching the mixture with an aqueous mineral acid, such as aqueous hydrochloric acid, and subsequently precipitating the crude 2-hydrocarbyl-3,3-bis(4-hydroxyaryl)phthalimide. The crude product is then dissolved in an aqueous inorganic base comprising an alkali metal or alkaline earth metal hydroxide (e.g., aqueous NaOH), carbonate, or bicarbonate to provide a first solution. Next, the first solution of the crude product is treated with a suitable solid adsorbent that can remove color-forming species present in the solution. In one embodiment, commercially available activated carbon can be used. Treatment with the activated carbon removes color-forming species present in the solution. Suitable activated carbon include, but are not intended to be limited to, the NORIT series of activated carbon available from Norit Corporation, and those activated carbons commercially available from E. Merck Company. The decolorizing efficiency of the activated carbon is indicated by its methylene blue number. Generally, an activated carbon with a relatively higher methylene blue number is less expensive than an activated carbon having a relatively lower methylene blue number. Applicants find that even activated carbons having relatively higher methylene blue numbers are effective decolorizing agents. After treatment with the activated carbon, the resulting mixture is filtered to provide a second solution.

In addition to functioning as a decolorizing agent, the activated carbon treatment also aids in selectively adsorbing the impurities that lead to color. Thus, one method for purifying a crude 2-hydrocarbyl-3,3-bis(4-hydroxyaryl)phthalimide product comprises contacting an aqueous base solution of the crude product with the activated carbon and filtering off the carbon to provide a second solution. The second solution may again be treated in the same manner, if desired, to provide further reductions in the levels of impurity.

The decolorized and purified solution is next treated with an aqueous mineral acid, such as aqueous hydrochloric acid to precipitate 2-hydrocarbyl-3,3-bis(4-hydroxyaryl)phthalimide. The precipitate is then finally stirred with an aliphatic alcohol or mixture of aliphatic alcohol and water to remove any trace of the phenolphthalein that may still be present and subsequently filtered to furnish purified 2-hydrocarbyl-3,3-bis(4-hydroxyaryl)phthalimide. Suitable aliphatic alcohols include any aliphatic monohydric or dihydric alcohol. Non-limiting examples of suitable aliphatic alcohols include methanol, ethanol, iso-propanol, iso-butanol, n-butanol, tertiary butanol, n-pentanol, iso-pentanol, cyclohexanol, ethylene glycol, propylene glycol, neopentyl glycol and the like. In a particular embodiment, aliphatic monohydric alcohols that are miscible with water, such as methanol, ethanol, and iso-propanol are used. Methanol is the preferred aliphatic alcohol for removing phenolphthalein In another embodiment, a method for purifying crude 2-hydrocarbyl-3,3-bis(4-hydroxyaryl)phthalimide product comprises dissolving the crude product in an aqueous base solution, treating the aqueous base solution of the crude product with the activated carbon, filtering off the carbon to provide a second solution, and acidifying the second solution with an aqueous acid to precipitate the 2-hydrocarbyl-3,3-bis(4-hydroxyaryl)phthalimide. The resulting product can then be contacted with an aliphatic alcohol in the manner previously described.

The general methods described hereinabove can advantageously be applied for preparing para, para-PPPBP having an undetectable level or nearly so of a,p-PPPBP (as measured by HPLC technique). In one embodiment, the purified para, para-PPPBP may also comprise up to 1,000 parts per million of phenolphthalein, but it is preferred to have little phenolphthalein.

The 2-hydrocarbyl-3,3-bis(4-hydroxyaryl)phthalimidines, including the exemplary 2-phenyl-3,3-bis(4-hydroxyphenyl)phthalimide, are commercially valuable monomers or comonomers for producing a variety of polymers and polymer compositions formed by reactions of the phenolic OH groups of the 2-hydrocarbyl-3,3-bis(4-hydroxyaryl)phthalimidines. Suitable polymers that can be produced are polymers selected from the group consisting of homopolymers and copolymers of a polycarbonate, a polyestercarbonate, a polyester, a polyesteramide, a polyimide, a polyetherimide, a polyamideimide, a polyether, a polyethersulfone, a polysulfone, a polyphenylsulfone, a polycarbonate-polyorganosiloxane block copolymer, a copolymer comprising aromatic ester, estercarbonate, and carbonate repeat units; and a polyetherketone. A suitable example of a copolymer comprising aromatic ester, estercarbonate, and carbonate repeat units is the copolymer produced by the reaction of a hydroxy-terminated polyester, such as the product of reaction of isophthaloyl chloride, and terephthaloyl chloride with resorcinol, with phosgene and an aromatic dihydroxy compound, such as bisphenol A.

In one embodiment, polycarbonates having desirable properties are synthesized, wherein the polycarbonates include structural units (residues) of formula (VII):

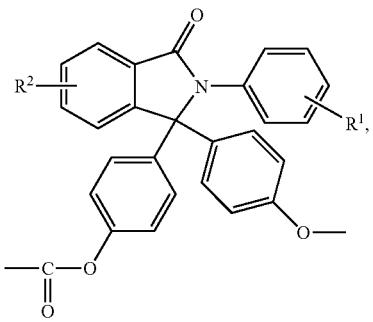

(VII)

which are derived from 2-hydrocarbyl-3,3-bis(4-hydroxyaryl)phthalimide; wherein $R^1$ and $R^2$ are as described previously; and the C=O groups in the carbonate linkages between residues are derived from a C=O donor such as phosgene or a carbonic acid diester; where the 2-hydrocarbyl-3,3-bis(4-hydroxyaryl)phthalimide comprises less than or equal to 1,000 parts per million of the amine impurity (e.g., a,p-PPPBP) relative to an overall weight of said 2-hydrocarbyl-3,3-bis(4-hydroxyaryl)phthalimide.

The polycarbonate composition may further comprise structural units derived from at least one other aromatic dihydroxy compound such as is represented by the general formula (VIII):

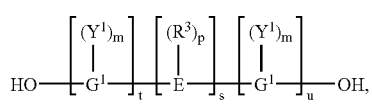

(VIII)

wherein each $G^1$ is an independently aromatic group; E is selected from the group consisting of an alkylene group, an alkylidene group, a cycloaliphatic group, a sulfur-containing linkage group, a phosphorus-containing linkage group, an ether linkage group, a carbonyl group, a tertiary nitrogen group, and a silicon-containing linkage group; $R^3$ is a hydrogen or a monovalent hydrocarbon group each; $Y^1$ is independently selected from the groups consisting of a monovalent hydrocarbyl group, an alkenyl group, an allyl group, a halogen, an oxy group and a nitro group; each m is independently a whole number from zero through the number of positions on each respective $G^1$ available for substitution; p is a whole number from zero through the number of positions on E available for substitution; t is a natural number greater than or equal to one; s is either zero or one; and u is a whole number.

Suitable examples of E include cyclopentylidene, cyclohexylidene, 3,3,5-trimethylcyclohexylidene, methylcyclohexylidene, 2-[2.2.1]-bicycloheptylidene, neopentylene, cyclopentadecylidene, cyclohexylidene, and adamantylidene; a sulfur-containing linkage such as sulfide, sulfoxide or sulfone, a phosphorus-containing linkage such as phosphinyl, phosphinyl, an ether linkage, a carbonyl group, a tertiary nitrogen group, and a silicon-containing linkage such as a silane or siloxy linkage.

In the aromatic dihydroxy comonomer compound shown in Formula (VIII), when more than one $Y^1$ substituent is present, they may be the same or different. The same holds true for the $R^3$ substituent. Where "s" is zero in formula (VIII) and "u" is not zero, the aromatic rings are directly joined with no intervening alkylidene or other bridge. The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some embodiments, the parameters "t", "s", and "u" are each one; both $G^1$ radicals are unsubstituted phenylene radicals; and E is an alkylidene group such as isopropylidene. In particular embodiments, both $G^1$ radicals are p-phenylene, although both may be ortho- or meta-phenylene or one ortho- or meta-phenylene and the other para-phenylene.

Some illustrative, non-limiting examples of aromatic dihydroxy compounds of formula (VIII) include the dihydroxy-substituted aromatic hydrocarbons disclosed by name or formula (generic or specific) in U.S. Pat. No. 4,217,438. Some particular examples of aromatic dihydroxy compound comonomers include, but are not intended to be limited to, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'methylphenyl)cyclohexane (DMBPC), 1,1-bis(3,5-dimethyl-4-hydroxyphenyl)cyclohexane; 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-

1-methyl-ethyl]-phenol (2,8 BHPM), 3,8-dihydroxy-5a,10b-diphenylcoumarano-2',3',2,3-coumarane (DCBP), 2-phenyl-3,3-bis(4-hydroxyphenyl)phthalimide, 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol, 4,4'-bis(3,5-dimethyl)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl) benzene, 1,4-bis(2-(4-hydroxy-3-methylphenyl)-2-propyl) benzene 2,4'-dihydroxyphenyl sulfone, 4,4'-dihydroxydiphenylsulfone (BPS), bis(4-hydroxyphenyl) methane, 2,6-dihydroxy naphthalene, hydroquinone, resorcinol, bisphenol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol. The most typical aromatic dihydroxy compound is Bisphenol A (BPA).

In some embodiments, an isosorbide comonomer can be used with the 2-hydrocarbyl-3,3-bis(4-hydroxyaryl)phthalimide monomer to produce polycarbonate copolymers. Isosorbide, sometimes also called 1,4:3,6-dianhydo-D-glucitol, is a rigid, chemically, and thermally stable aliphatic diol that tends to produce copolymers having higher glass transition temperatures, as compared to comonomer compositions which do not include isosorbide.

The carbonic acid diester described above has the general formula (IX):

$$(ZO)_2C{=}O \qquad (IX),$$

wherein each Z is independently an unsubstituted or substituted alkyl radical, or an unsubstituted or substituted aryl radical. Suitable examples of carbonic acid diesters include, but are not intended to be limited to, ditolyl carbonate, m-cresyl carbonate, dinaphthyl carbonate, diphenyl carbonate, diethyl carbonate, dimethyl carbonate, dibutyl carbonate, dicyclohexyl carbonate, and combinations of two or more carbonic acid diesters thereof. Diphenyl carbonate is widely used as a carbonic acid diester due to its low cost and ready availability on a commercial scale. If two or more of the carbonic acid diesters listed above are utilized, preferably one of the carbonic acid diesters is diphenyl carbonate.

Suitable carbonic acid diesters include the group of "activated aromatic carbonates". As used herein, the term "activated aromatic carbonate" is defined as a diaryl carbonate that is more reactive than diphenyl carbonate in a transesterification reaction. Such activated aromatic carbonates can also be represented by formula (IX), wherein each Z is an aryl radical having 6 to 30 carbon atoms. More specifically, the activated carbonates have the general formula (X):

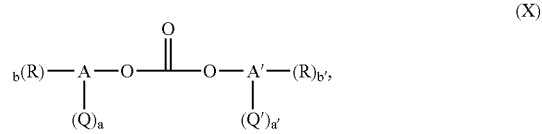

wherein Q and Q' are each independently an activating group; A and A' are each independently aromatic rings which can be the same or different depending on the number and location of their substituent groups, and a and a' is zero to a whole number up to a maximum equivalent to the number of replaceable hydrogen groups substituted on the aromatic rings A and A' respectively, provided a+a' is greater than or equal to 1. R and R' are each independently substituent groups such as alkyl, substituted alkyl, cycloalkyl, alkoxy, aryl, alkylaryl, cyano, nitro, or halogen. The term b is zero to a whole number up to a maximum equivalent to the number of replaceable hydrogen atoms on the aromatic ring A minus the number a, and the number b' is zero to a whole number up to a maximum equivalent to the number of replaceable hydrogen atoms on the aromatic ring A' minus the number a'. The number, type and location of R or R' on the aromatic ring is not intended to be limited unless they deactivate the carbonate and lead to a carbonate that is less reactive than diphenyl carbonate.

Non-limiting examples of suitable activating groups Q and Q' include (alkoxycarbonyl)aryl groups, (arylketone)aryl groups, halogens, nitro groups, amide groups, sulfone groups, sulfoxide groups, or imine groups with structures indicated below:

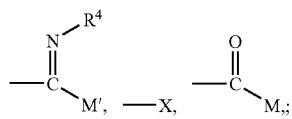

wherein X is halogen or $NO_2$; M and M' independently comprises N-dialkyl, N-alkyl aryl, alkyl, or aryl; and $R^4$ is alkyl or aryl. The activating groups are most preferably at the ortho position when A or $A^1$ are 6-member aryl rings, and may actually have a deactivating effect if included at other positions.

Specific non-limiting examples of activated aromatic carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Unsymmetrical combinations of these structures, wherein the substitution number and type on A and A' are different, are also contemplated. A preferred structure for the activated aromatic carbonate is an ester-substituted diaryl carbonate having the formula (XI):

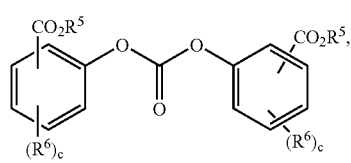

wherein $R^5$ is independently at each occurrence a $C_1$-$C_{20}$-alkyl radical, $C_4$-$C_{20}$ cycloalkyl radical, or $C_4$-$C_{20}$ aromatic radical; $R^6$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and c is independently at each occurrence an integer 0-4. At least one of the substituents $CO_2R^5$ is preferably attached in the ortho position of formula (XI).

Examples of preferred ester-substituted diaryl carbonates include, but are not limited to, bis(methylsilyl)carbonate (CAS Registry No. 82091-12-1) (also known as BMSC or bis(o-methoxycarbonylphenyl)carbonate), bis(ethyl salicyl) carbonate, bis(propyl salicyl)carbonate, bis(butylsalicyl)carbonate, bis(benzyl salicyl)carbonate, bis(methyl 4-chlorosalicyl)carbonate and the like. Preferably, BSMC is used in melt polycarbonate synthesis due to its lower molecular weight and higher vapor pressure.

Some non-limiting examples of non-activating groups which, even when present in an ortho position, would not be expected to result in activated carbonates are alkyl, cycloalkyl or cyano groups. Some specific and non-limiting examples of non-activated carbonates include bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures are also expected to result in non-activated carbonates.

Unsymmetrical diaryl carbonates, wherein one aryl group is activated and one aryl is inactivated, are useful if the combination still renders the diaryl carbonate more reactive than diphenyl carbonate.

One method for determining whether a certain diaryl carbonate is activated or is not activated is to carry out a model melt transesterification reaction between the particular diaryl carbonate and a phenol such as para-(1,1,3,3-tetramethyl) butyl phenol (and comparing the relative reactivity against diphenyl carbonate). This phenol is preferred because it possesses only one reactive site, possesses a low volatility, and possesses a similar reactivity to bisphenol-A. The model melt transesterification reaction is carried out at temperatures above the melting points of the particular diaryl carbonate and phenol in the presence of a transesterification catalyst, which is usually an aqueous solution of sodium hydroxide or sodium phenoxide. Preferred concentrations of the transesterification catalyst are at about 0.001 mole percent based on the number of moles of the phenol or diaryl carbonate. Although a preferred reaction temperature is 200° C., the choice of reaction conditions as well as catalyst concentration can be adjusted depending on the reactivity and melting points of the reactants to provide a convenient reaction rate. The reaction temperature is preferably maintained below the degradation temperature of the reactants. Sealed tubes can be used if the reaction temperatures cause the reactants to volatilize and affect the reactant molar balance. A determination of an equilibrium concentration of the reactants is accomplished through reaction sampling during the course of the reaction with subsequent analysis of the reaction mixture using well-known detection methods such as HPLC (high pressure liquid chromatography). Particular care needs to be taken so that the reaction does not continue after the sample has been removed from the reaction vessel. This is accomplished by cooling down the sample in an ice bath and by employing a reaction quenching acid, such as acetic acid in the water phase of the HPLC solvent system. It may also be desirable to introduce the reaction quenching acid directly into the reaction sample in addition to cooling the reaction mixture. A preferred concentration for the reaction quenching acid, e.g., acetic acid in the water phase of the HPLC solvent system, is about 0.05 mole percent. The equilibrium constant is then determined from the concentration of the reactants and product after equilibrium is reached. Equilibrium is assumed to have been reached when the concentration of components in the reaction mixture reach a point of little or no change on sampling of the reaction mixture. The equilibrium constant can be determined from the concentration of the reactants and products by methods well known to those skilled in the art. A diaryl carbonate which possesses a relative equilibrium constant ($K_{diarylcarbonate}/K_{diphenylcarbonate}$) of greater than 1 is considered to possess a greater reactivity than diphenyl carbonate and is a suitable activated aromatic carbonate for use in the present disclosure, whereas a diaryl carbonate which possesses an equilibrium constant of 1 or less is considered to possess the same or have less reactivity than diphenyl carbonate and is considered not to be activated. It is generally preferred to employ an activated aromatic carbonate with very high reactivity compared to diphenyl carbonate when conducting transesterification reactions. Preferred are activated aromatic carbonates with an equilibrium constant greater than at least 1,000 times that of diphenyl carbonate.

Polycarbonate compositions comprising the structural unit of formula (VII) and carbonate units derived from the activated carbonate preferably comprise at least one end group derived from the activated carbonate. In one embodiment, the end groups which are indicative of the activated aromatic carbonate has a structure of formula (XII):

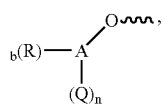

(XII)

wherein Q is an ortho-positioned activating group; A is an aromatic ring, n is a whole number of 1 to the number of replaceable hydrogen groups substituted on the aromatic ring A; R is a substituent group selected from the group consisting of alkyl, cycloalkyl, alkoxy, aryl, cyano, nitro, and halogen; and b is zero to a whole number to the number of replaceable hydrogen groups on the aromatic ring minus n. Q is preferably a radical independently selected from the group consisting of (alkoxycarbonyl)aryl groups, halogens, nitro groups, amide groups, sulfone groups, sulfoxide groups, or imine groups with structures

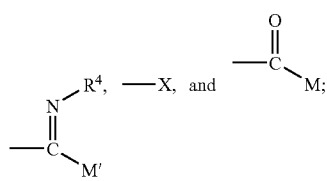

wherein X comprises halogen or $NO_2$, M and M' independently comprises N-alkyl, N-aryl, or N-alkyl aryl; $R^4$ comprises alkyl or aryl when n is 1; and n has a value of 0 or 1.

Polycarbonates prepared using ester-substituted diaryl carbonates, such as for example BMSC, may further comprise very low levels of structural features, which arise from side reactions taking place during the melt polymerization reaction between an ester-substituted diaryl carbonate of structure (XI) and dihydroxy aromatic compounds of structure (VIII). One such structural feature has a structure of formula (XIII):

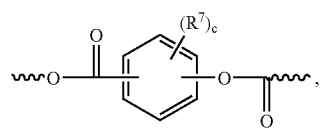

(XIII)

wherein $R^7$ is a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and c is a whole number of 1-4. Typically such kinks are present only to a minor extent (e.g., 0.2 to 1 mole percent).

Structure (XIII) is termed an internal ester-carbonate linkage or kink. Without wishing to be bound by any theory, it is thought that structure (XIII) may arise by reaction of an ester-substituted phenol by-product, for example methyl salicylate, at its ester carbonyl group with a dihydroxy aromatic compound or a hydroxyl group of a growing polymer chain. Further reaction of the ester-substituted phenolic hydroxy group leads to formation of a carbonate linkage. Thus, the ester-substituted phenol by-product of reaction of an ester-substituted diaryl carbonate with a dihydroxy aromatic compound may be incorporated into the main chain of a linear polycarbonate, for example.

Another structural feature present in melt transesterification polymerization reactions between ester-substituted diaryl carbonates and dihydroxy aromatic compounds is the ester-linked terminal end group having a free hydroxyl group and have the structure (XIV):

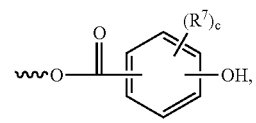

(XIV)

wherein $R^7$ and c are as defined above. Without wishing to be bound by any theory, it is believed that structure (XIV) may arise in the same manner as structure (XIII), but without further reaction of the ester-substituted phenolic hydroxy group. In the structures provided herein, the wavy line represents the polycarbonate polymer chain structure. End capping of the polymer chains made by this method may be only partial. In typical embodiments of polycarbonates prepared by the methods described herein, the free hydroxyl group content is from 7 percent to 50 percent. This number may be varied by changing reaction conditions or by adding additional end-capping agents. In one embodiment, wherein the activated carbonate used is BMSC, there will be an ester linked end group of structure (XV):

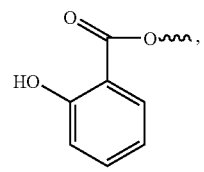

(XV)

which possesses a free hydroxyl group. Thus, for example, if the terminal group of structure (XV) is attached to a para, para-PPPBP unit in the polycarbonate chain then it is designated hereinafter as "p,p-PPPBP-salicyl-OH end", and if the terminal group of structure (XV) is attached to a BPA unit in the polycarbonate chain, it is hereinafter designated as "BPA-salicyl-OH end".

The polycarbonates made using activated carbonates typically comprise structural units indicative of the activated carbonate. These structural units may be end groups produced when activated carbonate fragments act as end capping agents or may be kinks introduced into the copolymer by incorporation of activated carbonate fragments.

The polycarbonate made, using the activated aromatic carbonate as described above, may also have end-groups having structure (XVI):

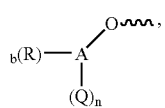

(XVI)

where R, b, A, Q, and n are defined in the preceding sections.

In one embodiment the terminal end group having structure (XVI) is a methyl salicyl group of structure (XVII):

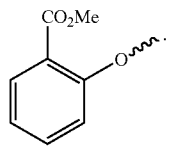

(XVII)

It could also include other salicyl groups such as the ethylsalicyl, isopropylsalicyl, and butylsalicyl groups.

A number of polymerization methods can be used for producing a polymer, such as a homopolycarbonate or a copolycarbonate, comprising structural units derived from a 2-hydrocarbyl-3,3-bis(4-hydroxyaryl)phthalimide, wherein the 2-hydrocarbyl-3,3-bis(4-hydroxyaryl)phthalimide comprises less than or equal to about 1,000 parts per million of a 2-hydrocarbyl-3-{(4-hydroxyaryl)(2-hydroxyaryl)}phthalimide relative to an overall weight of the purified 2-hydrocarbyl-3,3-bis(4-hydroxyaryl)phthalimide. Suitable methods for fabricating polycarbonates, for example, include a melt transesterification polymerization method, an interfacial polymerization method, and a bischloroformate polymerization method.

As used herein, the term "structural units derived from" when used in the context of describing the portions of the copolycarbonates derived from the aliphatic diol and the aromatic dihydroxy compounds refers to the fact that both such monomers lose their respective hydrogen atoms upon incorporation in the polymer.

As used herein the term "activated carbonate" refers to a diaryl carbonate which is typically more reactive (either kinetically or thermodynamically) toward aromatic dihydroxy compounds than diphenyl carbonate under identical conditions. Activated carbonates are typically (but not necessarily) substituted diaryl carbonates.

As used herein the term "structural units indicative of the activated carbonate" means either internal "kinks" in the copolycarbonate or end groups caused by incorporation of a fragment of an activated carbonate such as bismethylsalicyl carbonate (sometimes hereinafter referred to as "BMSC").

The melt transesterification polymerization method is generally carried out by combining a catalyst and a reactant composition to form a reaction mixture; and mixing the reaction mixture under reactive conditions for a time period effective to produce a polycarbonate product. The reactant composition for the polymer generally comprises a carbonic acid diester (e.g., diphenyl carbonate), and the 2-hydrocarbyl-3,3-bis(4-hydroxyaryl)phthalimide, wherein the 2-hydrocarbyl-3,3-bis(4-hydroxyaryl)phthalimide comprises less than or equal to about 1,000 parts per million of a,p-PPPBP relative to the overall weight of said 2-hydrocarbyl-3,3-bis(4-hydroxyaryl)phthalimide.

During the manufacture of the polycarbonates by the melt transesterification method using the activated or unactivated carbonic acid diester, the amount of the carbonic acid diester typically comprises about 0.8 moles to about 1.30 moles, and more specifically about 0.9 moles to about 1.2 moles, based on one mole of the 2-hydrocarbyl-3,3-bis(4-hydroxyaryl)phthalimide, or the combination of the 2-hydrocarbyl-3,3-bis(4-hydroxyaryl)phthalimide and all aromatic dihydroxy comonomers, if present.

Suitable melt transesterification catalysts include alkali metal compounds, alkaline earth metal compounds, tetraorganoammonium compounds, and tetraorganophosphonium compounds, combinations comprising at least one of the foregoing catalysts.

Specific examples of alkali metal compounds or alkaline earth metal compound transesterification catalysts include organic acid salts, inorganic acid salts, oxides, hydroxides, hydrides, and alcoholates of alkali metals and alkaline earth metals. Preferably, the catalyst is an alkali metal compound of the formula $M_1X_1$, wherein $M_1$ is selected from the group consisting of lithium, sodium, and potassium; and $X_1$ is selected from the group consisting of hydroxide and OAr, wherein Ar is a monovalent aromatic radical.

More specifically, examples of suitable alkali metal compound catalysts include, but are not limited to, sodium hydroxide, potassium hydroxide, lithium hydroxide, calcium hydroxide, magnesium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, lithium salts of phenol, and the like.

Specific examples of alkaline earth metal catalysts include, but are not limited to, calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, strontium stearate, and the like.

Exemplary tetraorganoammonium compounds include compounds comprising structure (XVIII):

(XVIII)

wherein $R^8$-$R^{11}$ are independently a $C_1$-$C_{20}$ alkyl radical, $C_4$-$C_{20}$ cycloalkyl radical or a $C_4$-$C_{20}$ aryl radical and $X^-$ is an organic or inorganic anion. Suitable anions (X⁻) include hydroxide, halide, carboxylate, sulfonate, sulfate, carbonate and bicarbonate. In one embodiment, the transesterification catalyst comprises tetramethyl ammonium hydroxide.

In still other embodiments, the catalyst is a tetraorganophosphonium compound. Exemplary quaternary phosphonium compounds include compounds comprising structure (XIX):

wherein $R^8$-$R^{11}$ and $X^-$ are as previously described. Illustrative anions include hydroxide, halide, carboxylate, sulfonate, sulfate, carbonate, and bicarbonate.

Where $X^-$ is a polyvalent anion such as carbonate or sulfate it is understood that the positive and negative charges in structures (XVIII) and (XIX) are properly balanced. For example, when $R^9$-$R^{12}$ in structure (XVIII) are each methyl groups and $X^-$ is carbonate, it is understood that $X^-$ represents ½ ($CO_3^{-2}$) as will be appreciated by those skilled in the art.

Specific examples of tetraorganoammonium compounds and tetraorganophosphonium compounds include, but are not limited to tetramethylammonium hydroxide, tetrabutylammonium hydroxide, tetraethylphosphonium hydroxide, tetrabutylphosphonium acetate, tetrabutylphosphonium hydroxide, and the like.

In one embodiment, the catalyst comprises tetrabutylphosphonium acetate. In an alternate embodiment, the catalyst comprises a mixture of an alkali metal salt or alkaline earth metal salt with at least one quaternary ammonium compound, at least one quaternary phosphonium compound, or a mixture thereof. For example, the catalyst may be a mixture of sodium hydroxide and tetrabutylphosphonium acetate. In another embodiment, the catalyst is a mixture of sodium hydroxide and tetramethyl ammonium hydroxide.

In another embodiment, the catalyst comprises an alkaline earth metal salt of an organic acid, an alkali metal salt of an organic acid, or a salt of an organic acid comprising both alkaline earth metal ions and alkali metal ions. Alkali metal and alkaline earth metal salts of organic acids, such as for example, formic acid, acetic acid, stearic acid and ethylenediamine tetraacetic acid can also be used. In one embodiment, the catalyst comprises magnesium disodium ethylenediamine tetraacetate (EDTA magnesium disodium salt).

In yet another embodiment, the catalyst comprises the salt of a non-volatile inorganic acid. By "non-volatile" it is meant that the referenced compounds have no appreciable vapor pressure at ambient temperature and pressure. In particular, these compounds are not volatile at temperatures at which melt polymerizations of polycarbonate are typically conducted. The salts of non-volatile acids are alkali metal salts of phosphites; alkaline earth metal salts of phosphites; alkali metal salts of phosphates; and alkaline earth metal salts of phosphates. Suitable salts of non-volatile acids include $NaH_2PO_3$, $NaH_2PO_4$, $Na_2H_2PO_3$, $KH_2PO_4$, $CsH_2PO_4$, $Cs_2H_2PO_4$, or a mixture thereof. In one embodiment, the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst.

Any of the catalysts disclosed above may be used as combinations of two or more substances. The catalyst may be added in a variety of forms. The catalyst may be added as a solid, for example as a powder, or it may be dissolved in a solvent, for example, in water or alcohol. The total catalyst composition is preferably about $1 \times 10^{-7}$ to about $2 \times 10^{-3}$ moles, and with about $1 \times 10^{-6}$ to about $4 \times 10^{-4}$ moles more preferred for each mole of the combination of the purified para, para-PPPBP and the aromatic dihydroxy compound comonomer.

Any of the catalysts described above for use in polycarbonate melt transesterification reactions may be used in reactions involving activated carbonates. It is often advantageous to use a combination of some amount of a salt of an alkaline earth metal and/or an alkali metal (i.e., an "alpha" catalyst) that does not degrade at temperatures used throughout the reaction together with a quaternary ammonium and/or a quaternary phosphonium compound that does degrade at a temperature used in the reaction (i.e., a "beta" catalyst). The total amount of catalyst employed is about $1 \times 10^{-7}$ to about $1 \times 10^{-2}$, and preferably about $1 \times 10^{-7}$ to about $2 \times 10^{-3}$ moles catalyst per total moles of the mixture of para, para-PPPBP and aromatic dihydroxy compound employed.

The reactants for the polymerization reaction using an activated or non-activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants.

The melt polymerization reaction using the activated aromatic carbonate is conducted by subjecting the above reaction mixture to a series of temperature-pressure-time protocols. In some embodiments, this involves gradually raising the reaction temperature in stages while gradually lowering the pressure in stages. In one embodiment, the pressure is reduced from about atmospheric pressure at the start of the reaction to about 0.01 millibar (1 Pascal) or in another embodiment to 0.05 millibar (5 Pascals) in several steps as the reaction approaches completion. The temperature may be varied in a stepwise fashion beginning at a temperature of about the melting temperature of the reaction mixture and subsequently increased to about 320° C. In one embodiment, the reaction mixture is heated from about ambient (about 21-23° C.) temperature to about 150° C. The polymerization reaction starts at a temperature of about 150° C. to about 220° C., then is increased to about 220° C. to about 250° C. and is then further increased to a temperature of about 250° C. to about 320° C. and all sub-ranges there-between. The total reaction time is about 30 minutes to about 200 minutes and all sub-ranges there between. This procedure will generally ensure that the reactants react to give polycarbonates with the desired molecular weight, glass transition temperature and physical properties. The reaction proceeds to build the polycarbonate chain with production of a by-product such as, for example an ester-substituted alcohol e.g., methyl salicylate. Efficient removal of the by-product may be achieved by different techniques such as reducing the pressure. Generally the pressure starts relatively high in the beginning of the reaction, such as atmospheric pressure in one embodiment, and is lowered progressively throughout the reaction and temperature is raised throughout the reaction. Experimentation is needed to find the most efficient conditions for particular production equipment.

The progress of the reaction may be monitored by measuring the melt viscosity or the weight average molecular weight of the reaction mixture using techniques known in the art such as gel permeation chromatography. These properties may be measured by taking discreet samples or may be measured on-line. After the desired melt viscosity and/or molecular weight is reached, the final polycarbonate product may be isolated from the reactor in a solid or molten form. It will be appreciated by a person skilled in the art, that the method of making polycarbonates as described in the preceding sections may be made in a batch or a continuous process and the process disclosed herein is essentially preferably carried out in a solvent free mode. Reactors chosen should ideally be self-cleaning and should minimize any "hot spots."

In one embodiment, the aliphatic homopolycarbonate and aliphatic-aromatic copolycarbonate may be prepared in an extruder in presence of one or more catalysts, wherein the carbonic acid diester is an activated aromatic carbonate. The reactants for the polymerization reaction can be fed to the extruder in powder or molten form. In one embodiment, the reactants are dry blended prior to addition to the extruder. The extruder may be equipped with pressure reducing devices (e.g., vents), which serve to remove the activated phenol by-product and thus drive the polymerization reaction toward completion. The molecular weight of the polycarbonate product may be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, side-streams and sizes. One skilled in the art may have to experiment to find the best designs using generally known principals of commercial extruder design. Vented extruders similar to those that are commercially available may also be used.

The process disclosed herein can be used to prepare PPPBP homopolycarbonate and copolycarbonates having a weight average molecular weight (Mw) of about 3,000 to about 150,000 and a glass transition temperature (Tg) of about 80° C. to about 300° C. The number average molecular weights (Mn) of the homopolycarbonate and copolycarbonates is from about 1,500 to about 75,000. The transparency of cast films made from the polycarbonate or copolycarbonates prepared in accordance with the present disclosure can be greater than about 85 percent, as determined by a Haze Guard Instrument.

In monitoring and evaluating polycarbonate synthesis, it is of particular interest to determine the concentration of Fries product present in the polycarbonate. The generation of significant Fries product can lead to polymer branching, resulting in uncontrollable melt behavior. In the process of preparing polycarbonates described herein, some branching reaction (Fries reaction) takes place (especially at higher temperatures and exacerbated by alpha catalysts) resulting in a Fries product. Fries products are defined as structural units of the product polycarbonate which upon hydrolysis of the product polycarbonate affords a carboxy-substituted dihydroxy aromatic compound bearing a carboxy group adjacent to one or both of the hydroxy groups of the carboxy-substituted dihydroxy aromatic compound. For example, in bisphenol A polycarbonate prepared by a melt polymerization method in which Fries reaction occurs, the Fries product comprises structure (XX) below, which affords 2-carboxy bisphenol A upon complete hydrolysis of the product polycarbonate. As indicated, the Fries product may serve as a site for polymer branching, the wavy lines of structure (XX) indicating a polymer chain structure.

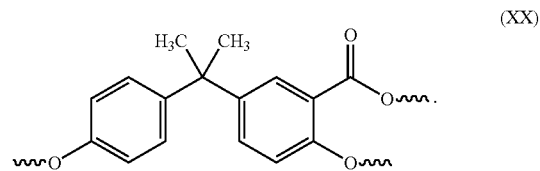

(XX)

The polycarbonates prepared using the activated carbonate by the disclosed method have a concentration of Fries product of less than about 500 parts per million (ppm) as measured by high performance liquid chromatography (HPLC). The Fries concentration is much less than what is obtained in a conventional melt polymerization process that uses diphenyl carbonate as the carbonic acid diester. Fries products are generally undesirable for certain polycarbonates because excessive levels can adversely affect certain physical properties.

In the interfacial polymerization method, 2-hydrocarbyl-3,3-bis(4-hydroxyaryl)phthalimide, with or without one or more comonomers, and phosgene are reacted in the presence of an acid acceptor and an aqueous base to produce said polycarbonate. Tertiary amines, such as for example, trialkylamines are preferably used as acid acceptors. An exemplary trialkylamine is triethylamine. Suitable aqueous bases include, for example, the alkali metal hydroxides, such as sodium hydroxide. The interfacial method can be used for producing polycarbonates comprising structural units derived from 2-hydrocarbyl-3,3-bis(4-hydroxyaryl)phthalimide, and preferably having molecular weights greater than about 50,000, relative to polystyrene standard.

The interfacial method described above can be suitably adapted to produce polycarbonates through the intermediate formation of 2-hydrocarbyl-3,3-bis(4-hydroxyaryl)phthalimide bischloroformate. This method is sometimes called the bischloroformate polymerization method. In one embodiment, the method comprises reacting a 2-hydrocarbyl-3,3-bis(4-hydroxyaryl)phthalimide with phosgene in an organic solvent, and then reacting the bischloroformate either with a 2-hydrocarbyl-3,3-bis(4-hydroxyaryl)phthalimide, or an aromatic dihydroxy compound in the presence of an acid acceptor and an aqueous base to form the polycarbonate.

The interfacial polymerization method and the bischloroformate polymerization method can be carried in a batch or a continuous mode using one or more reactor systems. To carry out the process in a continuous mode, one or more continuous reactors, such as for example, a tubular reactor can be used. In one embodiment, the continuous method comprises introducing into a tubular reactor system phosgene, at least one solvent (example, methylene chloride), at least one bisphenol, aqueous base, and optionally one or more catalysts (example, a trialkylamine) to form a flowing reaction mixture. The flowing mixture is then passed through the tubular reactor system until substantially all of the phosgene has been consumed. The resulting mixture is next treated with a mixture comprising an aqueous base, at least one end-capping agent, optionally one or more solvents, and at least one catalyst. The end-capped polycarbonate thus formed is continuously removed from the tubular reactor system. The process can be used for preparing end-capped polycarbonate oligomers (generally polycarbonates having a weight average molecular weight of less than or equal to 10,000 daltons) or polymers having a weight average molecular weight of greater than 10,000 daltons. The processes outlined hereinabove can also be suitably adapted, for example, to produce end-capped polycarbonates via the intermediate formation of a mixture comprising a bisphenol monochloroformate or a bisphenol bischloroformate.

In another embodiment, polymer blends comprise the polymers described previously and at least one thermoplastic polymer. The at least one thermoplastic polymer is selected from the group consisting of vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, ASA resins, polyethersulfones, poly(alkenylaromatic) polymers, polybutadiene, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene, polycarbonate-polyorganosiloxane block copolymers, copolymers comprising aromatic ester, estercarbonate, and carbonate repeat units; mixtures, and blends comprising at least one of the foregoing polymers.

The polymers and polymer blends described hereinabove are valuable for producing articles. In one embodiment, an article comprises a polymer comprising structural units derived from a 2-hydrocarbyl-3,3-bis(4-hydroxyaryl)phthalimide, which comprises less than or equal to about 1,000 parts per million of the amine impurity (e.g., a,p-PPPBP), relative to an overall weight of the 2-hydrocarbyl-3,3-bis(4-hydroxyaryl)phthalimide. In another embodiment, an article comprises a polymer comprising structural units derived from a 2-phenyl-3,3-bis(4-hydroxyphenyl)phthalimide, which comprises less than or equal to about 1,000 parts per million of a,p-PPPBP, relative to an overall weight of said 2-phenyl-3,3-bis(4-hydroxyphenyl)phthalimide.

Polymers, particularly polycarbonate homopolymers and copolymers comprising structural units derived from the high purity 2-hydrocarbyl-3,3-bis(4-hydroxyaryl)phthalimide in general, and para,para-PPPBP in particular, have a yellowness index (YI) of less than 10 as measured on a 3 millimeter thick plaque in accordance with ASTM D1925 in one embodiment, a YI of less than 6 in another embodiment, and a YI of less than 2 in still another embodiment. Hence, these polycarbonate polymers are useful for producing articles having a number of useful properties, such as a low residual color. The articles also exhibit excellent heat aging. Thus, extruded articles having low color values (as measured by yellowness index, YI) even after heat aging, such as, for example, a YI of less than about 2 after heat aging in air at 155° C.-160° C. for about 500 hours in one embodiment, and a YI of less than about 0.5 after heat aging in air at 120° C. for about 500 hours in another embodiment. The polycarbonate homopolymers and copolymers have high glass transition temperatures of higher than or equal to about 180° C. One of the unique properties of these polycarbonates, especially those that have glass transition temperatures of greater than or equal to about 180° C., is that during melt processing they exhibit a shear-thinning behavior. That is, the polymers have the ability to flow under an applied shear. Therefore, standard melt processing equipment used for BPA polycarbonates can advantageously be used for producing articles. The polycarbonates also have high transparency, as measured by percent light transmission, of greater than or equal to about 85 percent. Moreover, the copolycarbonate is especially useful for articles that are preferably made form a polymer having transparency and the other advantageous properties of a BPA homopolycarbonate, but with a significantly higher Tg. Lenses in applications where they are exposed to heat are a good example of such an application.

The polycarbonate compositions disclosed herein are particularly valuable for producing a variety of lenses suitable for diverse applications. In an embodiment, the lens comprises a polycarbonate, which comprises structural units of formula (VII) derived from a 2-hydrocarbyl-3,3-bis(4-hydroxyaryl)phthalimide comprising less than or equal to about 1,000 parts per million of the amine impurity corresponding to a,p-PPPBP relative to an overall weight of said 2-hydrocarbyl-3,3-bis(4-hydroxyaryl)phthalimide; and a yellowness index of less than 10 as measured on a 3 millimeter thick plaque in accordance with ASTM D1925 in one embodiment, and less than 6 in another embodiment. Non-limiting examples of suitable articles include an automotive headlamp inner lens, an automotive headlamp outer lens, an automotive fog lamp lens, an automotive bezel, a medical device, a display device, electrical connectors, under the hood automotive parts, and projector lens. Examples of suitable display devices include a laptop computer screen, a liquid crystal display screen, and an organic light-emitting diode display screen.

The polycarbonates disclosed herein may also be combined with effective amounts of one or more of various types of additives used selected from the group consisting of fillers, fire retardants, drip retardants, antistatic agents, UV stabilizers, heat stabilizers, antioxidants, plasticizers, dyes, pigments, colorants, processing aids, and mixtures thereof. These additives are known in the art, as are their effective levels and methods of incorporation. Effective amounts of the additives vary widely, but they are usually present in an amount up to about 50% or more by weight, based on the weight of the entire composition. Especially preferred additives include hindered phenols, thio compounds and amides derived from various fatty acids. The typical amounts of these additives generally ranges up to about 2% total combined weight based on the total weight of the composition.

In another embodiment, polymer blends consisting essentially of at least one thermoplastic polymer and a polymer comprising structural units derived from a 2-hydrocarbyl-3,3-bis(4-hydroxyaryl)phthalimide, such as 2-phenyl-3,3-bis(4-hydroxyphenyl)phthalimide, but which do not contain a fire retardant additive, such as a phosphorus-containing compound (which is traditionally for preparing fire-retardant polymer compositions), surprisingly exhibit excellent fire retardance (a V-0 or V-1 rating in accordance with the standards set forth by Underwriter Laboratories) without compromising on the other desirable physical properties, such as room temperature impact, tensile modulus, heat distortion temperature or glass transition temperature. Accordingly, one can prepare fire-retardant compositions, molding compositions, and molded articles comprising any polymer that has structural units derived from a 2-hydrocarbyl-3,3-bis(4-hydroxyaryl)phthalimide. Further, without wishing to be bound by any theory, it is believed that the presence of the impurities in the 2-hydrocarbyl-3,3-bis(4-hydroxyaryl)phthalimide monomer, such as the 2-hydrocarbyl-3-{(4-hydroxyaryl)(2-hydroxyaryl)}phthalimide, or the substituted or the unsubstituted phenolphthalein, will not affect the fire-retardance of compositions consisting essentially of flammable thermoplastic polymers and the polymer comprising structural units derived from the 2-hydrocarbyl-3,3-bis(4-hydroxyaryl)phthalimide. However, depending upon the end-use applications and/or the relative amounts of such a polymer in a final resin blend, the presence of impurities such as the ones described above in the starting monomer may or may not be critical. For other applications, such as for example, molding compositions having a low color, a yellowness index of less than or equal to about 10 (as measured on a 3 millimeter thick plaque in accordance with ASTM D1925) can be obtained without any significant loss in other physical properties by employing a polymer prepared from 2-hydrocarbyl-3,3-bis (4-hydroxyaryl)phthalimide monomer having less than about 1,000 parts per million of the a,p-PPPBP compound.

Suitable thermoplastic polymers for producing flame retardant compositions (FR polymers) that can be blended with polymers made from p,p-PPPBP include one or more polymers each having structural units derived from one or more monomers selected from the group consisting of vinyl aromatic monomers, monoethylenically unsaturated nitrile monomers, and $C_1$-$C_{12}$ alkyl(meth)acrylate monomers. In an embodiment, rubber-modified graft copolymers and polymers comprising such copolymers are suitable for producing the flame retardant compositions.

Suitable vinyl aromatic monomers include, but are not intended to be limited to, styrene and substituted styrenes having one or more alkyl, alkoxyl, hydroxyl or halo substituent group attached to the aromatic ring, Exemplary vinyl aromatic monomers include, for example, alpha-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers, among others.

As used in the present context the term "monoethylenically unsaturated nitrile monomer" means an acyclic compound that comprises a single nitrile group and a single site of ethylenic unsaturation per molecule. Suitable monoethylenically unsaturated nitrile monomers include, but are not intended to be limited to, acrylonitrile, methacrylonitrile, and alpha-chloro acrylonitrile.

The terminology "(meth)acrylate monomers" refers collectively to acrylate monomers and methacrylate monomers. Suitable $C_1$-$C_{12}$ alkyl(meth)acrylate monomers include, but are not intended to be limited to, $C_1$-$C_{12}$ alkyl acrylate monomers, e.g., ethyl acrylate, butyl acrylate, iso-pentyl acrylate, n-hexyl acrylate, 2-ethyl hexyl acrylate, and their $C_1$-$C_{12}$ alkyl methacrylate analogs, e.g., methyl methacrylate, ethyl methacrylate, propyl methacrylate, isopropyl methacrylate, butyl methacrylate, hexyl methacrylate, and decyl methacrylate.

In one embodiment, the FR polymer comprises a vinyl aromatic polymer having structural units derived from one or more vinyl aromatic monomers, for example styrene, and having structural units derived from one or more monoethylenically unsaturated nitrile monomers, for example acrylonitrile. In another embodiment, the thermoplastic polymer comprises from about 55 to about 99 weight percent, and in other embodiments, from about 60 to about 90 weight percent of structural units derived from styrene; and in other embodiments, from about 1 to about 45 weight percent, and in still other embodiments from about 10 to about 40 weight percent of structural units derived from acrylonitrile. In one embodiment, the weight average molecular weight of such types of thermoplastic polymer is from about 50,000 to about 100,000 daltons, relative to polystyrene standards.

The FR polymer can also comprise at least one rubber modified graft copolymer comprising a discontinuous rubber phase dispersed in a continuous rigid thermoplastic phase, wherein at least a portion of the rigid thermoplastic phase is chemically grafted to the rubber phase. Hereinafter the term "rubber modified graft copolymer" is sometimes referred to as a rubber modified thermoplastic resin. In one embodiment, rubber modified graft copolymers comprise those made by a bulk or, synonymously, a mass polymerization process. In another embodiment, rubber modified graft copolymers comprise those made by emulsion polymerization. Suitable rubbers for use in making the rubber phase comprise those having a glass transition temperature ($T_g$) of less than or equal to 25° C. in one embodiment, less than or equal to 0° C. in another embodiment, and less than or equal to minus 30° C. in yet another embodiment. The rubber comprises a polymer, which is often a linear polymer, having structural units derived from one or more conjugated diene monomers. Suitable conjugated diene monomers include, but are not intended to be limited to, 1,3-butadiene, isoprene, 1,3-hexadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene, and dibromobutadiene; as well as mixtures of conjugated diene monomers. In other embodiments, the conjugated diene monomer comprises at least one of 1,3-butadiene or isoprene.

In other embodiments, the rubber may optionally include structural units derived from one or more copolymerizable monoethylenically unsaturated monomers selected from $C_2$-$C_8$ olefin monomers, vinyl aromatic monomers, monoethylenically unsaturated nitrile monomers, and $C_1$-$C_{12}$ alkyl (meth)acrylate monomers. As used herein, the term "$C_2$-$C_8$ olefin monomers" means a compound having from 2 to 8 carbon atoms per molecule and having a single site of ethylenic unsaturation per molecule. Suitable $C_2$-$C_8$ olefin monomers comprise, example, ethylene, propene, 1-butene, 1-pentene, and heptene. Suitable vinyl aromatic monomers, monoethylenically unsaturated nitrile monomers, and $C_1$-$C_{12}$ alkyl (meth)acrylate monomers comprise those previously described.

In one embodiment, the rubber is a polybutadiene homopolymer. In another embodiment, the rubber is a copolymer, for example, a block copolymer comprising structural units derived from one or more conjugated diene monomers and up to 50 percent by weight of structural units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer. More specifically, the rubber can be a styrene-butadiene block copolymer that contains from about 50 to about 95 weight percent of structural units derived from butadiene, and from about 5 to about 50 weight percent of structural units derived from styrene. Suitable rubber polymers may also comprise structural units derived from butyl acrylate. In another embodiment, the rubber is an ethylene-propylene-diene modified rubber.

The elastomeric rubber phase may be made by aqueous emulsion polymerization in the presence of a free radical initiator, a polyacid surfactant, and optionally, a chain transfer agent. The resulting polymer emulsion can be coagulated to form particles of the elastomeric phase material. Suitable free radical include, but are not intended to be limited to, an organic peroxide compound, such as benzoyl peroxide; a persulfate compound, such as potassium persulfate; an azonitrile compound, such as, 2,2'-azobis-2,3,3-trimethylbutyronitrile (sometimes abbreviated in common parlance as "AIBN"); or a redox initiator system, such as a combination of cumene hydroperoxide, ferrous sulfate, tetrasodium pyrophosphate, and a reducing sugar or sodium formaldehyde sulfoxylate. Suitable chain transfer agents include, but are not intended to be limited to, a $C_9$-$C_{13}$ alkyl mercaptan compound, such as nonyl mercaptan, tertiary dodecyl mercaptan, or the like.

The emulsion polymerized particles of the elastomeric rubber phase material can have a weight average particle size in one embodiment of about 50 to about 1,000 nanometers ("nm"), in another embodiment of about 50 to about 800 nm, and in yet another embodiment of from 100 to 500 nm, as measured by light transmission. The size of emulsion polymerized elastomeric particles may optionally be increased by mechanical, colloidal or chemical agglomeration of the emulsion-polymerized particles according to known techniques.

Specific FR thermoplastic polymers that can be used in a polymer blend with a polymer comprising structural units derived from a 2-hydrocarbyl-3,3-bis(4-hydroxyaryl)phthalimide can be selected from the group consisting of ABS resins, ASA (acrylate-styrene-acrylonitrile) resins, acrylonitrile-butadiene copolymer, styrene-butadiene copolymers, ethylene-propylene-diene copolymers, and polyacrylates, such as those comprising poly(butyl acrylate) and poly(2-ethylhexyl acrylate).

Non-limiting examples of antioxidants that can be used in molding compositions in the aforementioned polymer blends, include for example, tris(2,4-di-tert-butylphenyl) phosphite, 3,9-di(2,4-di-tert-butylphenoxy)-2,4,8,10-tetraoxa-3,9-diphosphaspiro[5.5]undecane, 3,9-di(2,4-dicumylphenoxy)-2,4,8,10-tetraoxa-3,9-diphosphaspiro[5.5] undecane, tris(p-nonylphenyl)phosphite, 2,2',2"-nitrile [triethyl-tris[3,3',5,5'-tetra-tertbutyl-1,1'-biphenyl-2'-diyl] phosphite], 3,9-distearyloxy-2,4,8,10-tetraoxa-3,9-diphosphaspiro[5.5]undecane, dilauryl phosphite, 3,9-di[2,6-di-tert-butyl-4-methyl-phenoxy]-2,4,8,10-tetraoxa-3,9-diphosphaspiro[5.5]undecane and tetrakis(2,4-di-tert-butylphenyl)4,4'-bis(diphenylene)phosphonite, distearyl pentaerythritol diphosphite, diisodecyl pentaerythritol diphosphite, 2,4,6-tri-tert-butylphenyl-2-butyl-2-ethyl-1,3-propanediol phosphite, tristearyl sorbitol triphosphite, tetrakis(2,4-di-tert-butylphenyl)4,4'-biphenylene diphosphonite, (2,4,6-tri-tert-butylphenyl)-2-butyl-2-ethyl-1,3-propanediolphosphite, tri-isodecylphosphite, and mixtures of phosphites containing at least one of the foregoing. Of these, tris(2,4-di-tert-butylphenyl) phosphite, 2,4,6-tri-tert-butylphenyl-2-butyl-2-ethyl-1,3-propanediol phosphite, bis(2,4-di-tert-butylphenyl)pentaerythritol diphosphite as well as mixtures of phosphites containing at least one of the foregoing phosphates are preferred for some applications.

Non-limiting examples of processing aids include Doverlube® FL-599 (available from Dover Chemical Corporation), Polystyrene (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers include 2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-alpha-methylbenzyl-5'-methyl, 3'-alpha-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl-, 5-chloro-3',5'-di-tert.-amyl-derivative, and Tinuvin® 234 (available from Ciba Specialty Chemicals); 2,4-bis-(2'-hydroxyphenyl)-6-alkyl-s-triazines, e.g., the 6-ethyl-, 6-heptadecyl- or 6-undecyl-derivative; 2-hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy- or 2'-hydroxy-4,4'-dimethoxy-derivative; 1,3-bis-(2'-hydroxybenzoyl)-benzenes, e.g., 1,3-bis-(2'-hydroxy-4'-hexyloxybenzoyl)-benzene, 1,3-bis-(2'-hydroxy-4'-octyloxy-benzoyl)-benzene or 1,3-bis-(2'-hydroxy-4'-dodecyloxybenzoyl)-benzene; esters of optionally substituted benzoic acids, e.g., phenylsalicylate octylphenylsalicylate, dibenzoylresorcin, bis-(4-tert.-butylbenzoyl)resorcin, benzoylresorcin, 3,5-di-tert.-butyl-4-hydroxybenzoic acid-2,4-di-tert.-butylphenyl ester or -octadecyl ester or -2-methyl-4,6-di-tert.-butyl ester; acrylates, e.g., alpha-cyano-beta, beta-diphenylacrylic acid-ethyl ester or isooctyl ester, alpha-carbomethoxycinnamic acid methyl ester, alpha-cyano-beta-methyl-p-methoxycinnamic acid methyl ester or -butyl ester or N(beta-carbomethoxyvinyl)-2-methyl-indolin; oxalic acid diamides, e.g., 4,4'-di-octyloxy-oxamide, 2,2'-di-octyloxy-5,5'-di-tert.-butyl-oxamide, 2,2'-di-dodecyloxy-5,5-di-tert.-butyl-oxamide, 2-ethoxy-2'-ethyl-oxamide, N,N'-bis-(3-dimethyl-aminopropyl)-oxalamide, 2-ethoxy-5-tert.-butyl-2'-ethyloxanilide and the mixture thereof with 2-ethoxy-2'-ethyl-5,4'-di-tert-butyl-oxamide, or mixtures of ortho- and para-methoxy—as well as of ortho- and para-ethoxy di-substituted oxanilides. In one embodiment, the ultraviolet light absorber can be selected from the group of 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha, alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; and a nickel butylamine complex with 2,2'-thiobis(4-tert-butylphenol), 2-ethoxy-2'-ethyloxanilide or 2-ethoxy-2'-ethyl-5,5'-ditert-butyloxanilide.

In other embodiments, the fire retardant polymer blends comprise at least one thermoplastic polymer and a 2-phenyl-3,3-bis(4-hydroxyphenyl)phthalimide/BPA polycarbonate copolymer in an amount greater than 7 weight percent of the total weight of the blend, wherein the polymer blend is free of a fire retardant phosphorous containing compound, and has at least a V-1 fire rating, as measured in accordance with Underwriter Laboratories UL-94 Vertical Burn Test procedure dated Jul. 29, 1997. In other embodiments, depending upon the relative composition of the thermoplastic polymer and the 2-phenyl-3,3-bis(4-hydroxyphenyl)phthalimide/BPA polycarbonate copolymer, such polymer blends may also have a V-1 fire rating, as measured in accordance with Underwriter Laboratories UL-94 Vertical Burn Test procedure dated Jul. 29, 1997. Polymer blends having at a V-1 fire rating or better are valuable for many commercial applications. An exemplary polymer blend comprises a blend of 2-phenyl-3,3-bis (4-hydroxyphenyl)phthalimide/BPA polycarbonate copolymer and an acrylonitrile-butadiene-styrene copolymer as the thermoplastic polymer component. As described in this embodiment, the polymer blend is free of a fire retardant phosphorous containing compound such as, for example, polymeric or non-polymeric organic phosphorus species selected from the group consisting of phosphate esters, thiophosphate esters, phosphonate esters, thiophosphonate esters, phosphonate esters, thiophosphonate esters; phosphines, including triphenylphosphine; phosphine oxides, including triphenylphosphine oxide and tris(2-cyanoethyl)

phosphine oxide, thiophosphine oxide; and phosphonium salts. The polymer blend in this embodiment can be free of any phosphorous containing compounds that function as fire retardants, but may include phosphorous containing compounds that do not function as fire retardants, e.g., phosphite based additives, and the like. Alternatively, the blend may include non-polymeric phosphate esters including, for example, alkyl phosphate esters, aryl phosphate esters, resorcinol-based phosphate esters, and bisphenol-based phosphate esters. Exemplary organic phosphorus species are aromatic phosphate esters, non-limiting examples of which includes triphenylphosphate, tricresylphosphate, resorcinol bis(diphenylphosphate), bisphenol A bis(diphenylphosphate), tris(nonyl)phenylphosphate, mixtures of the foregoing aromatic phosphate esters, and other aromatic phosphate esters known in the art.

The fire-retardant compositions may further comprise one or more fluoropolymers in an amount that is effective to provide anti-drip properties to the compositions. Suitable fluoropolymers and methods for making such fluoropolymers are known, such as for example, U.S. Pat. Nos. 3,671,487 and 3,723,373. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Suitable fluorinated alpha-olefin monomers include, e.g., fluoroethylenes such as, tetrafluoroethylene, trifluoroethylene, 1,1-difluoroethylene, fluoroethylene, 1,1-difluoro-2-chloroethylene, 1,1-difluoro-1,1-dichloroethylene, 1,2-difluoro-1,2-dichloroethylene, 1-fluoro-2,2-dichloroethylene, 1-chloro-1-fluoroethylene, and 1,1,2-trichloro-2-fluoroethylene; and fluoropropylenes, such as e.g., hexafluoropropylene, 1,1,1,3-tetrafluoropropylene, 1,1,1,3,3-pentafluoropropylene, and 1,1,1,2-tetrafluoropropylene. In other embodiments suitable fluorinated alpha-olefin copolymers include copolymers comprising structural units derived from two or more fluorinated alpha-olefin copolymers such as, e.g., poly(tetrafluoroethylene-hexafluoropropylene), and copolymers comprising structural units derived from one or more fluorinated monomers and one or more non-fluorinated monoethylenically unsaturated monomers that are copolymerizable with the fluorinated monomers such as, e.g., poly(tetrafluoroethylene-ethylene-propylene) copolymers. Suitable non-fluorinated monoethylenically unsaturated monomers include e.g., alpha-olefin monomers such as, e.g., ethylene, propylene, butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, and vinyl versatile. In a particular embodiment the fluoropolymer is a poly(tetrafluoroethylene) homopolymer ("PTFE"). The fluoropolymer can be incorporated in the polymer blends by any of the methods known in the art, such as those disclosed in commonly owned U.S. Patent Application US 2003/0109650 (published on Jun. 12, 2003).

The flame retardant resinous compositions may optionally comprise at least one impact modifier other than the rubber modified graft copolymer and rubber modified graft copolymers, described above. Such impact modifiers include core-shell type impact modifiers comprising a poly(alkyl acrylate) or poly(alkyl methacrylate) shell. Other suitable impact modifiers comprise core-shell type impact modifiers comprising a poly(methylmethacrylate) shell. In still other embodiments, suitable impact modifiers include those which are core-shell type impact modifiers comprising a shell of poly(methylmethacrylate) and a core comprising a polybutadiene rubber. In still other embodiments, suitable core-shell type impact modifiers have a shell comprising poly(methylmethacrylate) and a core comprising a silicone rubber. Illustrative silicone rubbers include poly(diorganosiloxanes) such as poly(dimethylsiloxane). In other embodiments, suitable impact modifiers are those which are core-shell type impact modifiers including a shell comprising poly(methylmethacrylate) and a core comprising a silicone rubber and at least one other polymer with a glass transition temperature higher than that of the silicone rubber. In still other embodiments, suitable impact modifiers comprise those which are core-shell type impact modifiers including a shell comprising poly(methylmethacrylate) and a core comprising a silicone rubber and at least one poly(alkylacrylate) with a glass transition temperature higher than that of the silicone rubber. In a particular embodiment, a suitable impact modifier is a core-shell type impact modifier, such as those which include a shell comprising poly(methylmethacrylate) and a core comprising a silicone rubber and poly(butylacrylate). One type of suitable core-shell impact modifier can be prepared in accordance with the method of Sasakii et al. as taught in U.S. Pat. No. 5,132,359. In some embodiments, suitable impact modifiers include those sold under the trade name METABLEN by Mitsubishi Rayon Co., Ltd.

The fire-retardant compositions described hereinabove are valuable for producing articles. The above-described polymers and of copolymers comprising structural units derived from 2-hydrocarbyl-3,3-bis(4-hydroxyaryl)phthalimide monomers, such as p,p-PPPBP can be thought of as a phosphorus-free fire-retardant additive useful for blending with other polymers to produce articles, particularly thin-walled fire-retardant articles having a wall thickness of about 1 to about 2 millimeters in one embodiment, and about 2 to about 5 millimeters in another embodiment. Generally, the thinner the wall thickness of a molded article, the more difficult it is to achieve effective fire-retardance (e.g., a V-0 UL94 rating), or a desired short "flame out time" (abbreviated in this disclosure as "FOT"). An exemplary copolymer, which is very effective as such a polymeric fire-retardant additive is a polycarbonate comprising structural units derived from a monomer mixture of 75 weight percent of bisphenol A and 25 weight percent of p,p-PPPBP. Such a copolymer can be prepared by any method known in the art for producing polycarbonates (discussed previously).

EXAMPLES

In the following examples, molecular weights were measured by gel permeation chromatography using a polycarbonate standard. Unless otherwise noted, all molecular weights described herein are weight average molecular weights based on polycarbonate standards. Glass transition temperatures of the polycarbonates were measured by differential scanning calorimetry by heating the sample at the rate of 10° C. to 20° C. per minute under nitrogen. Yellowness index was measured using ASTM D1925 test method on plaques of 3 millimeter thickness and on films of 0.2 millimeter thickness. Films were prepared in a petri dish by casting from a solution of 1.1 grams of a polycarbonate in about 10 milliliters of chloroform.

Molded articles were prepared by first preparing pellets of the molding compositions using a 25 millimeter ZSK twin-screw extruder, followed by injection molding using a L&T DEMAG 60 molding machine having a clamping capacity of 60 ton, a screw diameter of 25 millimeters, and shot capacity of 58 grams of polystyrene.

The data in the following table shows that copolymers made from PPPBP/BPA have greater oxygen and moisture permeability than BPA polycarbonate homopolymer.

|  | Oxygen Permeability cc * mm/(m2-day-atm) | Water Vapor Permeability gm * mm/(m2-day-atm) |
|---|---|---|
| Lexan XHT215 | 95.24 | 91.49 |
| Lexan 124 | 85.72 | 56.87 |

LEXAN® XHT215 resin is a polycarbonate copolymer containing 45 mole % of the PPPBP, with the balance being BPA residues. LEXAN® 124 resin is a standard BPA polycarbonate homopolymer product. The oxygen permeability of the samples was measured on Mocon equipment, at 23° C. and 0% relative humidity. The water vapor was measured at 38° C. and 100% relative humidity. The parts measured were about 1 mm in thickness. Some illustrative examples of potential uses for a polycarbonate having better oxygen and water vapor permeability than commercially available BPA polycarbonate include food packaging, vials requiring bacteria or plant growth, membranes and membranes bonded to stainless steel.

Below is provided an improved method for determining a,p-PPPBP. This method is used in Examples 11 and 12 below. A Zorbax XDB-C18, 5μ, 4.6×150 mm column with a detection at 230 nm was used. A Shimadzu Class-Vp instrument was employed. The following reagents were used: pure, fresh, milliQ water, HPLC grade methanol, HPLC grade acetonitrile and AR grade orthophosphoric acid. The reagents were used to create the following mobile phase components: (A) 0.02% v/v of $H_3PO_4$ in water; (B) methanol and (C) Acetonitrile (90:10:5). The column temperature was 40 degrees C. The flow rate was 1.0 ml/min. The injection volume was 10 uL. The detection wavelength was 230 nm. Data was acquired for 27 minutes. The mobile phase components were combined in the following weight ratios and flowed at the times (in minutes) as shown in the following table.

| Time | % of A | % of B | % of C |
|---|---|---|---|
| 0 | 90 | 10 | 5 |
| 20 | 10 | 60 | 30 |
| 25 | 10 | 60 | 30 |
| 27 | 90 | 10 | 5 |
| 35 | 90 | 10 | 5 |

*It is thought that the numbers reading 90 in the above table should instead be 85. A minor variation in the effluent make up should just change the relevant times slightly.

A calibration table was created by running the following standards solutions:

Phenolphthalein Standard Preparation (Stock Solution)
Weigh accurately about 100 mg of phenolphthalein standard into a 100 ml volumetric flask
Dissolve and dilute to volume with methanol (A)
Pipette 0.5 ml of solution A into a 25 ml volumetric flask
Dilute to volume with Methanol (B) (0.5 mg/25 ml)

PPPBP Standard Preparation (Stock Solution)
Weigh accurately about 100 mg of PPPBP standard into a 100 ml volumetric flask.
Dissolve and dilute to volume with methanol (C)
Pipette 500 ul of solution C into a 10 ml volumetric flask.
Dissolve and dilute to volume with methanol (D) (0.5 mg/10 ml)

Preparation of HPLC Calibration Solution

| Std | Volume of solution B (μl) | Volume of solution D (μl) | Final volume (dilution with methanol) |
|---|---|---|---|
| 1 | 200 | 20 | 10 ml |
| 2 | 400 | 40 | 10 ml |
| 3 | 600 | 60 | 10 ml |
| 4 | 800 | 100 | 10 ml |
| 5 | 1000 | 200 | 10 ml |

PPPBP Sample Solution Preparation
Weigh accurately about 50 mg of PPPBP into a 10 ml volumetric flask.
Dissolve and dilute to volume with methanol.
Inject the sample into high pressure liquid chromatograph (HPLC) and determine the amount of impurities present.

Calculation
% PPPBP=100−sum of all impurities
Final PPPBP purity=HPLC Purity−(water content by potassium fluoride titration [in %]+Methanol or other organic solvent [in %] by gas chromatograph (GC))

Retention Time
Expected retention time (Rt) for aminoPPPBP=14.3 min
Expected Rt for Phenolphthalein=15.4 min
Expected Rt for PPPBP=16.3 min
A typical HPLC chromatogram of PPPBP is provided in FIG. 1.

Example 11 is a procedure for preparing PPPBP monomer.
1. 37.27 Kg aniline and 11.4 Kg aqueous hydrochloric acid (HCl) (32% conc.) were transferred to glass lined reactor and stirred for 1 hour.
2. Heat slowly to 160° C., collect water and aniline azeotrope in receiver; water collected=7.75 liters, aniline collected=2.5 liters (Time=2-3 Hrs).
3. Separate the aniline layer and charge back into the reactor.
4. Add 31.83 Kg of phenolphthalein (PP) to the reactor. It is also possible to add all of the aniline, HCL and phenolphthalein together. The molar ratio of Aniline:HCl:PP was 4:1:1. A molar ratio of 7:1:1 was also sometimes used. 3:1:1 is also possible.
5. Maintain temperature at (155±2° C., 20-22 Hrs). In some instances the temperature may be subsequently reduced to 145±2 deg. C. The reaction time may be increased from 24 hrs. to 45 hrs due to slow kinetics. The reaction is continued until phenolphthalein detected in the reaction mass was reduced to about 1%.
6. Cool mixture to 110° C. and add 30 liters water.
7. Transfer contents to another reactor, which has ~25.1 Kg HCl (32% conc.) and 37 liters water, stir for 3 hours at room temperature.
8. Centrifuge the material. Wash with deionized water till chloride free—4 hours.
9. Wet cake ~62 Kg (Real weight—37.3 Kg).
10. Filtrate contains aniline hydrochloride; Theoretical Aniline=27.95 Kg.
11. (Aniline recovery from step 10 could be done with aq. NaOH addition, layer separation followed by EDC extraction of water layer, and distillation of crude aniline: yield 90%)

12. ~62 Kg wet cake product taken with 500 liters water (13 vols/kg of PPPBP) and 17.6 Kg NaOH lye (50%)–2 hours. In an alternate process, the amount of water can be reduced to 370 liters. (10 vols/kg of PPPBP) and 16.7 kg NaOH lye (50%) may be used.
13. Stirred for dissolution—1 hour.
14. Clarified through sparkler filter and filtrate collected in different vessel.
15. 4.0 Kg charcoal added and stirred for 2 hours at 40-45° C.
16. Filter the material ~2 hours.
    Repeat steps 13 and 14 until HPLC analysis shows that the a,p-PPPBP present is less than 50 ppm or more preferably less than 10 ppm. This typically requires 5 treatments.
17. Clarify material through 1 micron filter and collect filtrate.
18. The solution from step 18 is added slowly to 5% HCl. Adjust pH to ~3.5; needs ~25 Kg conc. HCl (32%) and 183 liters water—5 hours. Generally, 5-7% HCl was added to the alkaline solution of PPPBP till pH 3.5-4.5
19. Cool to room temperature, centrifuge and wash the solids with deionized water till chloride free (4 lots).
20. Wet cake—~55.7 Kg (Real 33.4 Kg)—Purity 99.6%.
21. Put 136 liters methanol instead of 4 vols pure MeOH) in a reactor and charge the above wet cake into it. Instead of methanol, a mixture of 90:10 MeOH water—4 vols/kg dry PPPBP—may be used for purification.
22. Heat to reflux and stir for 2 hours.
23. Cool to Room temperature (20-25° C.) and maintain for two hours. Alternately the reaction mass may be cooled to <10 deg. C., maintained for 1 hr. and filtered.
24. Centrifuge the solution and check the product for purity. Phenolphthalein and APHA should be in specs.
25. If required, repeat steps 22 through 25.
26. Re-slurry the centrifuged material with 136 liters deionized water and warm to 40° C. for 3 hours and centrifuge. The material is in specifications for methanol at this stage.
27. If not, repeat step 27.
28. Dry the product at 100-120 deg C.—24-48 hours till in spec for moisture.
    Drying done in FBD using 60 deg. C. air as the drying medium. Drying done in batches—batch time for each batch being 2 hr. Moisture levels of 0.1% (max.) and APHA of <20 achieved. Tray drying could be used instead.
29. Yield=31.8 Kg (80% theoretical), Purity>99.9%

Notes:

The total operation should be done so that the Fe spec should be below 5 ppm. Micron filters used for DM water, MeOH to avoid any suspended particles The entire operation should be done under inert atmosphere to avoid oxidation of RM and also for safety reasons.

Final drying done in FBD using air as the drying medium.

Example 12 is a preparation of a 45 mol % PPPBP/BPA copolymer having a YI of 5.8.

BPA (74 lbs), methylene chloride (CH2Cl2) (130 gallons), water (33 gallons) and a 70 wt % solution of methyltributylammonium chloride in water (900 ml) are charged to a reactor. A 50 wt % NaOH solution (50 lbs) is added to the reactor and the mixture is stirred. 611 lbs of a 17 wt % in caustic PPPBP solution (prepared by dissolving under nitrogen 250 kg of PPPBP in 2412 lbs water and 235 lbs of 50 wt % NaOH solution) is then charged to the reactor. It was found that it was critical to add the BPA, the NaOH and the monomer solution in that order. If the monomer solution were added before the NaOH, the monomer would precipitate and this would lead to bad color among other problems. Phosgene flow is started at 200 lbs/hr. A 33 wt % paracumyl phenol (PCP) solution in $CH_2Cl_2$ (7.53 kgs) is co-fed to the reactor at a constant rate starting at 25% of theoretical phosgene and ending at around 75% of theoretical phosgene. The reaction pH slowly drops as phosgene is added. The pH is allowed to drop to around 9, at which time additional 50 wt % caustic is co-fed as needed to maintain reaction pH at 9-10. Methylene chloride begins to reflux and is condensed and returned to the reactor. Pressure in the reactor is maintained at <10 psi. Phosgene flow is stepped down to 150 lbs/hr as reaction proceeds. Triethylamine (0.20 kg) is added to the reactor at 100% of theoretical phosgene. Phosgenation continues until 95 lbs of phosgene have been added, at which time the reaction mixture is sampled to ensure complete reaction.

The batch is transferred to another tank and aqueous HCl (30 wt %) is added to reduce the pH to 8-8.5. It is critical to be certain that the pH is reduced to 8-8.5. If the pH is left at 9 or 10, rapid degradation of the polymer will cause the YI to increase unacceptably. The batch is then centrifuged to remove the brine layer and the organic layer containing polymer is washed once with aqueous acid and twice with deionized water. It is critical in terms of obtaining good color for the reaction to be finished at a pH of 9 to 10. The polymer is isolated by steam precipitation followed by drying under N2. The final dried resin powder had Mw=24773 and PDI=2.37 (by GPC versus PC std), <1 ppm triethyl amine (TEA), 0.32 ppm chloride ion, 0.02 ppm Fe, 41 ppm residual BPA, and <10 ppm residual PPPBP. A sample of this resin was compounded with 0.1 phr tris(2,4-di-t-butylphenyl)phosphite, extruded, and molded to give a 125 mil thick color chip with YI=5.8, % Haze=1.2, and % Transmission=86.6.

The certificate of analysis of a lot of PPPBP monomer produced according to this example reports: APHA color=15 as a 15% solution, overall purity by HPLC=99.937%, o,p-impurity (actually aminophenol impurity)=21.3 ppm, Fe=2.89 ppm, residual phenolphthalein=0.0241%, residual aniline=not detected, melt point=290° C.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from essential scope thereof. Therefore, it is intended that the disclosure not be limited to the particular embodiment disclosed as the best mode contemplated for carrying out this invention, but that the disclosure will include all embodiments falling within the scope of the appended claims.

What is claimed is:

1. A composition comprising a polycarbonate, wherein the polycarbonate has a weight average molecular weight of greater than 15,000, comprises more than 15 mole percent structural units derived from a 2-aryl-3,3-bis(4-hydroxyaryl) phthalimide:

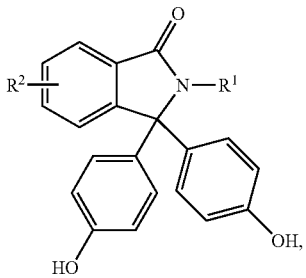

wherein R¹ is selected from the group consisting of aryl groups having 6 to 25 carbon atoms and aralkyl groups having 7 to 25 carbon atoms, and R² is selected from the group consisting of a hydrogen, a hydrocarbyl group, and a halogen; and the remainder of the structural units derived from 2,2-bis(4-hydroxyphenyl)propane (bisphenol A);

and further wherein the polycarbonate has a yellowness index of less than 10 as measured on a 3 millimeter thick plaque in accordance with ASTM D1925.

2. The composition of claim 1, wherein the composition further comprises a second thermoplastic polymer selected from the group consisting of a vinyl polymer, a rubber-modified graft copolymer, an acrylic polymer, polyacrylonitrile, a polystyrene, a polyolefin, a polyester, a polyurethane, a polyamide, a polysulfone, a polyimide, a polyetherimide, a polyphenylene ether, a polyphenylene sulfide, a polyether ketone, a polyether ether ketone, an ABS resin, an ASA resin, a polyethersulfone, a polyphenylsulfone, a poly(alkenylaromatic) polymer, a polybutadiene, polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polycarbonate-polyorganosiloxane block copolymer, and a copolymer comprising: (i) an aromatic ester, (ii) an estercarbonate, and a (iii) carbonate repeat units mixtures.

3. The composition according to claim 1, wherein the polycarbonate has more than 20 mole percent structural units derived from a 2-aryl-3,3-bis(4-hydroxyaryl)phthalimide.

4. The composition according to claim 1, wherein the polycarbonate has more than 40 mole percent structural units derived from a 2-aryl-3,3 -bis(4-hydroxyaryl)phthalimide and a yellowness index of less than 6 as measured on a 3 millimeter thick plaque in accordance with ASTM D1925.

5. The composition according to claim 4 wherein the polycarbonate has a weight average molecular weight of greater than 20,000.

6. An article comprising the composition of claim 1.

7. The article of claim 6, wherein the article is selected from the group consisting of automotive bumpers, other automotive exterior components, automobile mirror housings, automobile wheel covers, automobile instrument panels and trim, automobile glove boxes, automobile door hardware and other interior trim, automobile exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments, medical instruments, cookware, medical instrument trays, animal cages, fibers, laser welded medical devices and fiber optics.

8. The article of claim 6, wherein the article is selected from the group consisting of food packaging, vials requiring bacteria or plant growth, membranes and membranes bonded to stainless steel.

9. The composition according to claim 1 further comprising a UV stabilizer.

10. The composition according to claim 1 wherein the UV stabilizer is a 2-(2'-Hydroxyphenyl)-benzotriazole.

11. The composition according to claim 10 wherein the 2-(2'-Hydroxyphenyl)-benzotriazole is 2-(2H-benzotriazole-2-yl)-4,6-bis(1-methyl-1-phenylethyl)phenol.

12. An article comprising the composition of claim 10.

13. The article of claim 12 wherein the article is a selected from the group consisting of a lighting part, a lens and a display device.

14. A composition comprising a polycarbonate and a UV stabilizer selected from the group consisting of 2-(2'-Hydroxyphenyl)-benzotriazoles, wherein the polycarbonate has a weight average molecular weight of greater than 15,000, comprises more than 15 mole percent structural units derived from a 2-aryl-3,3-bis(4-hydroxyaryl)phthalimide:

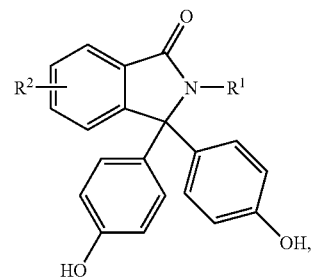

wherein R¹ is selected from the group consisting of aryl groups having 6 to 25 carbon atoms and aralkyl groups having 7 to 25 carbon atoms, and R² is selected from the group consisting of a hydrogen, a hydrocarbyl group, and a halogen; and the remainder of the structural units derived from at least one other aromatic dihydroxy compound having the formula:

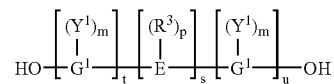

wherein each $G^1$ is an independently aromatic group; E is selected from the group consisting of an alkylene group, an alkylidene group, a cycloaliphatic group, a sulfur-containing linkage group, a phosphorus-containing linkage group, an ether linkage group, a carbonyl group, a tertiary nitrogen group, and a silicon-containing linkage group; $R^3$ is a hydrogen or a monovalent hydrocarbon group each; $Y^1$ is independently selected from the groups consisting of a monovalent hydrocarbyl group, an alkenyl group, an allyl group, a halogen, an oxy group and a nitro group; each m is independently a whole number from zero through the number of positions on each respective $G^1$ available for substitution; p is a whole number from zero through the number of positions on E available for substitution; t is a natural number greater than or equal to one; s is either zero or one; and u is a whole number; and further wherein the polycarbonate has a yellowness index of less than 10 as measured on a 3 millimeter thick plaque in accordance with ASTM D1925.

15. The composition of claim 14, wherein the UV stabilizer is 2-(2H-benzotriazole-2-yl)-4,6-bis(1-methyl-1-phenyl-ethyl)phenol.

16. The composition according to claim 14, wherein the polycarbonate has more than 40 mole percent structural units derived from a 2-aryl-3,3 -bis(4-hydroxyaryl)phthalimide and a yellowness index of less than 6 as measured on a 3 millimeter thick plaque in accordance with ASTM D1925.

17. The composition according to claim 16, wherein the polycarbonate has a weight average molecular weight of greater than 20,000.

18. An article comprising the composition of claim 14.

19. A lighting part comprising a composition comprising a polycarbonate and a UV stabilizer selected from the group consisting of 2-(2'-Hydroxyphenyl)-benzotriazoles, wherein the polycarbonate has a weight average molecular weight of greater than 15,000, comprises more than 15 mole percent structural units of the following formula derived from a 2-aryl-3,3 -bis(4-hydroxyaryl)phthalimide:

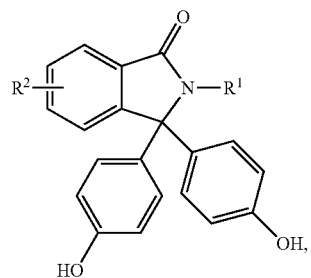

wherein $R^1$ is selected from the group consisting of aryl groups having 6 to 25 carbon atoms and aralkyl groups having 7 to 25 carbon atoms, and $R^2$ is selected from the group consisting of a hydrogen, a hydrocarbyl group, and a halogen; and the remainder of the structural units derived from 2,2-bis(4-hydroxyphenyl)propane (bisphenol A); and further wherein the polycarbonate has a yellowness index of less than 10 as measured on a 3 millimeter thick plaque in accordance with ASTM D1925.

20. The lighting part of claim 19, wherein the UV stabilizer is 2-(2H-benzotriazole-2-yl)-4,6-bis(1-methyl-1-phenyl-ethyl)phenol.

21. The composition of claim 1, wherein $R^1$ is phenyl and $R^2$ is hydrogen.

22. The composition of claim 14, wherein $R^1$ is phenyl and $R^2$ is hydrogen.

23. The composition of claim 19, wherein $R^1$ is phenyl and $R^2$ is hydrogen.

24. The composition of claim 14, wherein the other aromatic dihydroxy compound is 2,2-bis(4-hydroxyphenyl)propane (bisphenol A).

25. The composition of claim 14, wherein the other aromatic dihydroxy compound is 2,2-bis(4-hydroxyphenyl)propane (bisphenol A) and wherein the 2-(2'-Hydroxyphenyl)-benzotriazole is 2(2H-benzotriazol-2-yl)-4,6-bis(1-methyl1-phenylethyl)phenol.

26. A composition comprising a polycarbonate and a UV stabilizer selected from the group consisting of 2-(2'-Hydroxyphenyl)-benzotriazoles, wherein the polycarbonate has a weight average molecular weight of greater than 15,000, comprises more than 15 mole percent structural units derived from a 2-phenyl-3,3-bis(4-hydroxyphenyl) phthalimidine having the formula:

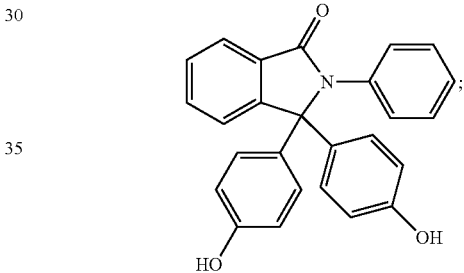

and the remainder of the structural units derived from 2,2-bis(4-hydroxyphenyl)propane (bisphenol A);
and further wherein the polycarbonate has a yellowness index of less than 10 as measured on a 3 millimeter thick plaque in accordance with ASTM D1925.

* * * * *